US005083128A

United States Patent [19]

Tsuji

[11] Patent Number: 5,083,128

[45] Date of Patent: Jan. 21, 1992

[54] LOW OBSERVABILITY APERTURE DESIGN FOR EXPENDABLE COUNTERMEASURES DEVICES

[75] Inventor: Kiyoshi Tsuji, Camarillo, Calif.

[73] Assignee: The United States of America as represented by the Secretary of the Navy, Washington, D.C.

[21] Appl. No.: 855,220

[22] Filed: Apr. 14, 1986

[51] Int. Cl.[5] ........................ H01Q 17/00; G01S 7/38

[52] U.S. Cl. ........................................... 342/2; 342/12

[58] Field of Search .................................. 342/1, 2, 12

[56] References Cited

U.S. PATENT DOCUMENTS 4,307,665 12/1981 Block ............................... 342/12 X 4,404,912 9/1983 Sindermann ...................... 342/12 X 4,646,644 3/1987 Richmond et al. ............... 342/12 X 5,049,883 9/1991 Woodward ........................... 343/12

*Primary Examiner*—T. H. Tubbesing

*Attorney, Agent, or Firm*—David S. Kalmbaugh

[57] ABSTRACT

A system for installing a plastisol or similar compound into the interior space of a spent squib-activated countermeasures cartridge. When the squib ignites and expels the countermeasures payload, the heat of combustion causes the plastisol to soften, react and expand to fill the empty container remaining after payload ejection. The foam filled container then acts as a radar absorber instead of a radar reflector and thus counters dispenser observability to RF energy.

9 Claims, 2 Drawing Sheets

LOW OBSERVABILITY APERTURE DESIGN FOR EXPENDABLE COUNTERMEASURES DEVICES

BACKGROUND

The present invention relates to radar countermeasures and particularly to eliminating the radio frequency (RF) observability by radar of empty holes left by airborne dispensers after their expendable countermeasures payloads are ejected. The empty hole or container aperture of an expended countermeasures cartridge will act as a corner reflector and will enhance radar signal return and observability. Such enhancement can be countered by filling the hole with an RF energy absorbing material.

Prior methods to reduce or eliminate observability by radar was to operate dispenser doors which are closed after the dispenser payload was ejected. All empty cartridge tube holes, however, remain observable until the dispenser doors are closed. An individual door for each tube is not practical because of costly design complexity and dispenser geometric consideration. Also, a hinged door in itself can act as a corner reflector while in the open position during dispense operation.

It is an object of the invention, therefore, to provide a system for eliminating RF observability by radar of empty holes left in airborne countermeasures dispensers following the expending of their payloads.

Another object of the invention is to provide a system for filling an empty cartridge tube with plastic foam plastisol material immediately following ejection of the cartridge payload.

DESCRIPTION OF THE PREFERRED EMBODIMENTS

Figure 2:
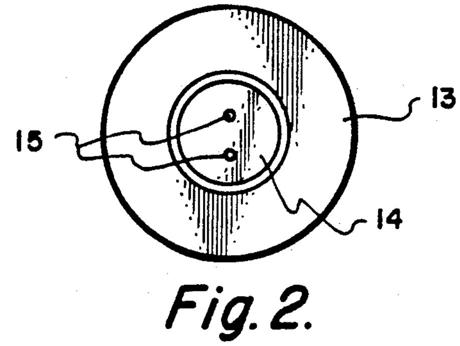
FIG. 2 is an end view of the countermeasures dispensing cartridge shown in FIG. 1.
Figure 1:
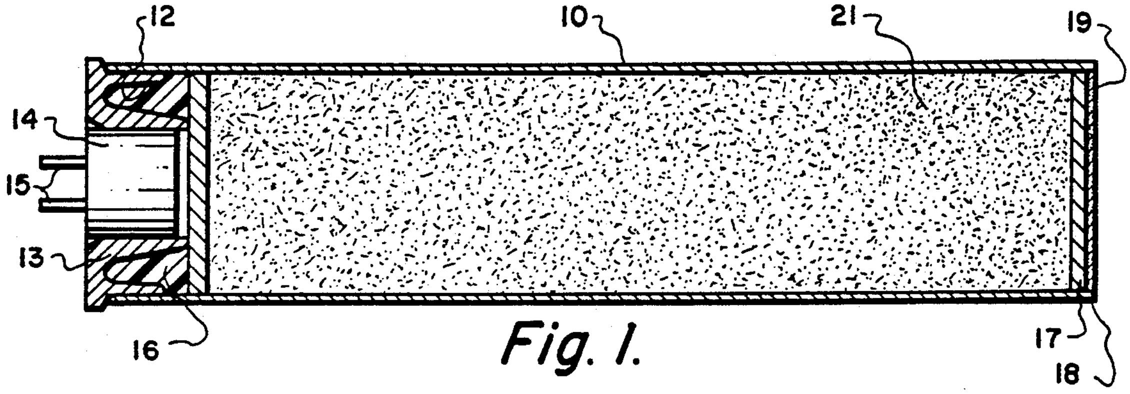
FIG. 1 is a cross sectional side view of a countermeasures dispenser cartridge incorporating the system of the present invention.

The chaff cartridge case 10, shown in FIG. 1, is typical of a number of countermeasure dispersing devices carried by a multiple dispenser tube on an aircraft. The present invention includes the addition of chamber 12 around the squib retainer 13 of the cartridge. Chamber 12 is doughnut shaped, for example. Squib 14 and retainer 13 are shown in FIGS. 1 and 2. Squib 14 is connected to a conventional energizing means (not shown) via electrical terminals 15. Squib 14, when energized, generates gas and heat. Chamber 12 is filled with a plastisol material 16 (such as: an uncured gel which forms a polyurethane type thermosetting foam, or an isocyanate prepolymer as disclosed in U.S. Pat. No. 3,830,760 to form a thermoplastic type foam, for example) or similar compound which is a semisolid dispersion of powdered polymer in a non-migrating liquid. When exposed to heat the polymer chemically reacts, softens and expands. Upon cooling it solidifies into a rigid low density plastic foam.

Figure 3:
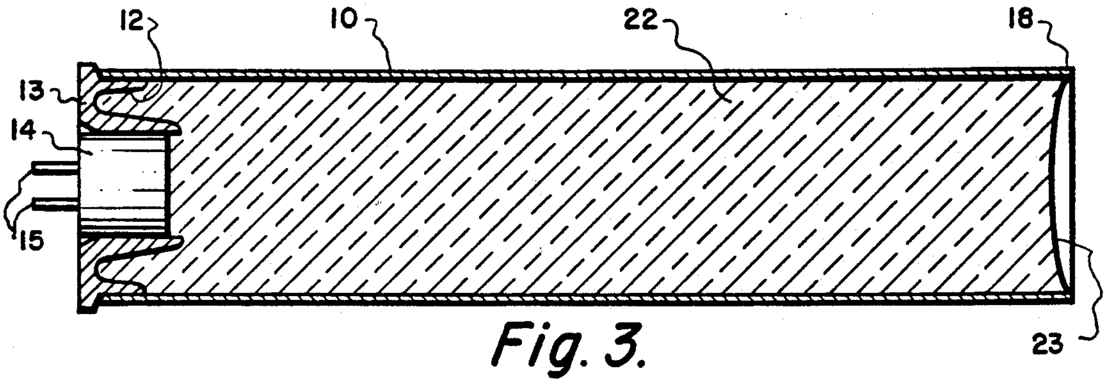
FIG. 3 is a cross-sectional view of the dispenser cartridge shown in FIG. 1, but showing the cartridge filled with plastic foam.
Figure 5:
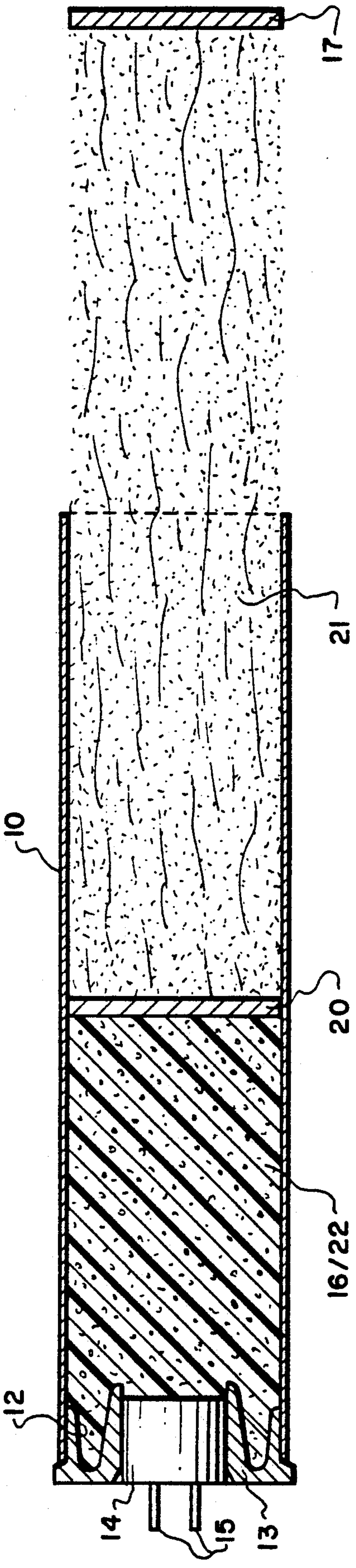
FIG. 5 is a cross-sectional view of the dispenser cartridge shown in FIG. 1, but showing the cartridge partially filled with plastic foam.

RF signal absorbers, such as graphite, can be added to act as a filler to the foam. End closure 17, located at the muzzle end 18 of the chaff cartridge case 10, can be easily precoated with a graphite based RF absorbent material 19, for example, to reduce observability during the pre-dispensing period of airborne flight. As shown in FIG. 1, the plastisol material 16 is confined within chamber 12 around squib retainer 13 and next to payload piston 20. Upon ignition of squib 14, the gas generated thereby forces piston 20 forward causing the ejection of the expendable payload 21; simultaneously, the heat of combustion triggers a blowing agent in the plastisol material 16 and sets off the foam producing reaction. The expanding plastisol material 16 forms a foam 22 which fills the space within cartridge tube 10 vacated by the expandable payload 21 as is best illustrated by FIGS. 3 and 5. The expendable payload may, in turn, be any countermeasure such as markers which may be dispensed from the chaff cartridge case 10 of the present invention. Upon exposure to the air streaming across the cartridge case muzzle 18, the foam 22 solidifies and forms a barrier at 23 and absorber of RF signal energy, as shown in FIG. 3.

Figure 4:
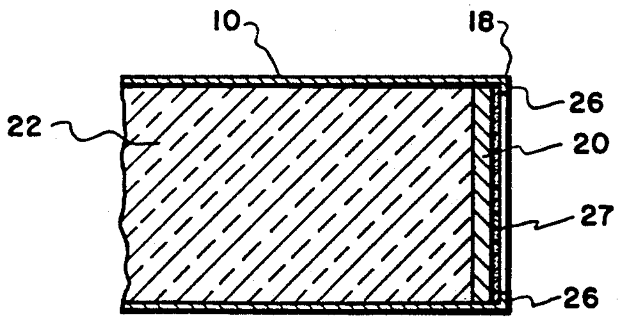
FIG. 4 is a partial cross-sectional view of the dispenser cartridge of FIG. 3, showing an embodiment where the tube is filled with plastic foam, but the piston is detained at the cartridge muzzle end.

If the payload piston 20 is detained at the muzzle 18 of the cartridge case, as in some dispensers, the foam 22 will fill the cartridge case 10 up to the detained piston, as shown in FIG. 4. The expanding foam 22 helps to position piston 20 as an end closure for the empty cartridge case. A small step 26 about the inside wall at the muzzle end of the cartridge case 10 operates to retain piston 20 as an end closure. Solidified foam 22 also operates to securely hold piston 20 in place so the piston cannot fall back due to air stream pressure, as can happen in countermeasure dispenser devices which merely use gas pressure to position a piston closure, upon their loss of gas pressure. The piston 20, in this case, is also precoated with an RF energy absorbing material 27, like 19 on end closure 17, or the piston may be made entirely from such energy absorbing material. If desired or required for some applications, especially where additional plastisol may be needed, a concentric liner (not shown) of plastisol material can be installed and used within the payload cartridge case 10.

Each tube aperture in a countermeasure dispenser is thus effectively protected with a foam filled cartridge case, in the above manner, for low radar observability before and after the expendable countermeasure ejection event, without any complicated electrical or mechanical control system. The dispenser is ready for reloading as soon as the foam filled expended cartridges are removed and discarded.

A primary advantage of this device is its simplicity, light weight, low cost, and the fact that RF observability is minimized both before and after the individual payload dispensing event for each dispenser tube. The dispenser tube is protected as soon as its cartridge case payload is ejected an while awaiting the other loaded tubes to complete their dispensing action. The use of the existing heat of combustion in the gases generated by the squib 14 during payload ejection to trigger the low aperture observability mechanism allows the squib to perform a dual purpose by providing a practical chemical reaction to accomplish the introduction of the RF energy absorbing functions.

The system described herein may be used with other cartridge case contained expendable devices carried by aircraft, etc., such as illumination flares, sonobuoys, markers, drogue chutes, and the like.

Obviously many modifications and variations of the present invention are possible in the light of the above teachings. It is therefore to be understood that within the scope of the appended claims, the invention may be practiced otherwise than as specifically described.

What is claimed is:

1. A system for eliminating RF observability by radar of empty holes left in airborne countermeasure dispensers following the expending of the countermeasure payloads, comprising:

a. a payload dispensing tube having an open end and a closed end;

b. an squib gas generating cartridge means positioned in the closed end of said dispensing tube;

c. a piston means slidably received within said dispensing tube and positioned proximate to said squib cartridge means;

d. a chamber adjacent said squib gas generating cartridge means and said piston means;

e. a plastisol material filling said chamber adjacent to said squib gas generating cartridge means; said plastisol material operable to be expanded to form a plastic foam upon activation by application of heat;

f. a payload means loaded into the open end of said dispensing tube and positioned between the open end of said tube and said piston means;

g. a removable closure means mounted at the open end of said payload dispensing tube and adapted to retain the payload means within the dispensing tube;

h. means for energizing said squib gas generating cartridge means to generate gas and heat; the gas generated by said squib gas generating cartridge means operating to drive said piston means forward toward the open end of said dispensing tube, forcing said removable closure means away from the open end of the dispensing tube and forcing the payload means to be dispensed out of the tube into the open air; simultaneously, the heat of combustion from said energized squib gas generating cartridge means operating to heat said heat activated plastisol material in the adjacent chamber, causing the plastisol material to react and expand, thereby filling the expended payload dispensing tube with plastic foam;

j. said plastic foam upon exposure to air forming a barrier and absorber of RF signal energy at the open end of said dispensing tube.

2. A system as in claim 1 wherein said removable closure mean has its outer surface coated with an RF energy absorbing material.

3. A system as in claim 1 wherein said chamber is ring shaped and surrounds said squib cartridge means.

4. A system as in claim 1 wherein said plastisol material, following activation and expansion, solidifies into a rigid low density plastic foam.

5. A system as in claim 1 wherein said plastic foam is thermosetting type.

6. A system as in claim 1 wherein said plastic foam is thermoplastic type.

7. A system as in claim 1 wherein the open end of said payload dispensing tube is provided with a retainer means for limiting said piston means from movement beyond the open muzzle end of said dispensing tube and for retaining said piston means as an end closure to said expended payload dispensing tube.

8. A system as in claim 7 wherein the forward side of said piston means looking toward the open end of said dispensing tube is coated with an RF energy absorbing material.

9. A system as in claim 7 wherein said piston means is made entirely from RF energy absorbing material.

* * * * *